Jan. 3, 1950     P. H. BELL     2,493,382
AUTOMATIC SAMPLE COLLECTOR
Filed Oct. 29, 1948     3 Sheets-Sheet 1

INVENTOR
PAUL H. BELL,
BY
ATTORNEY

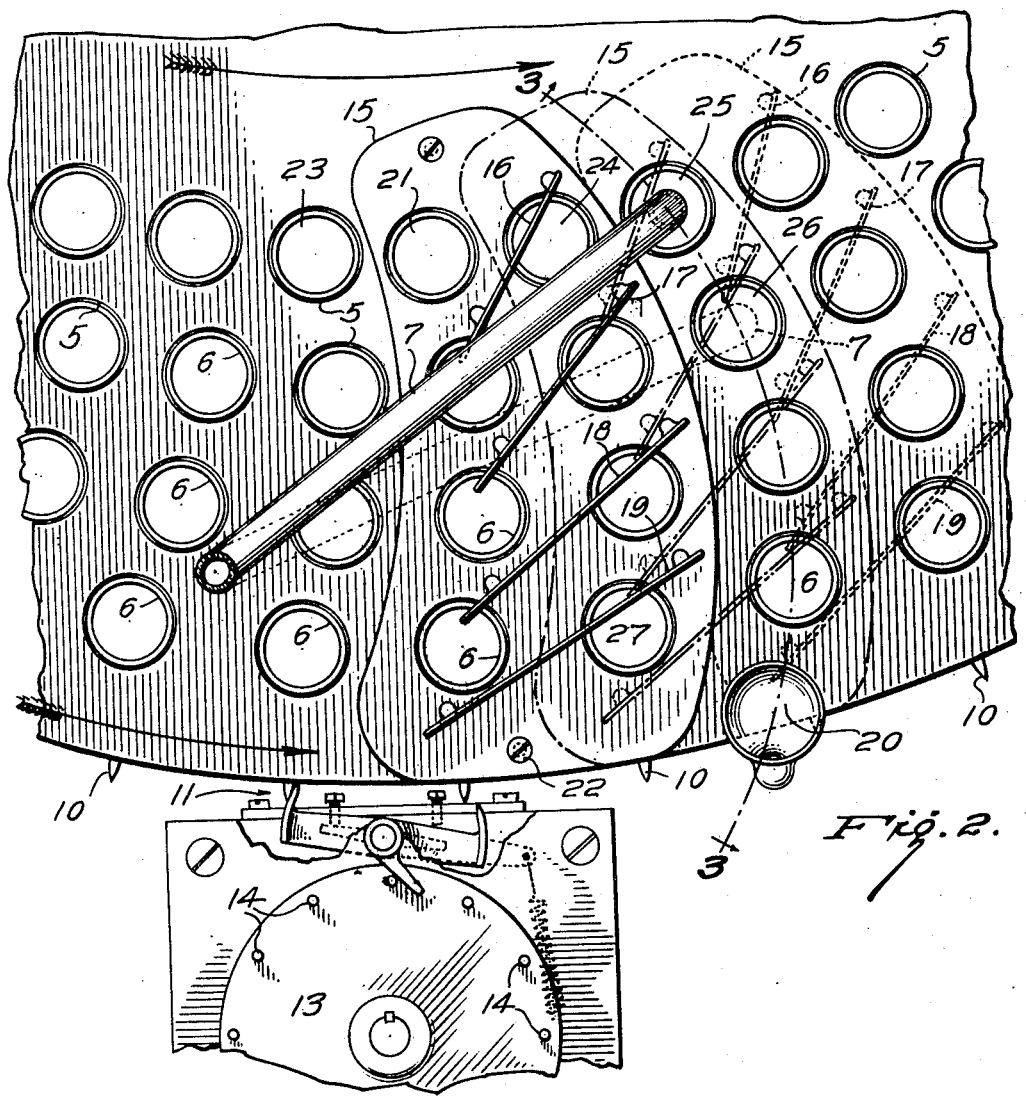
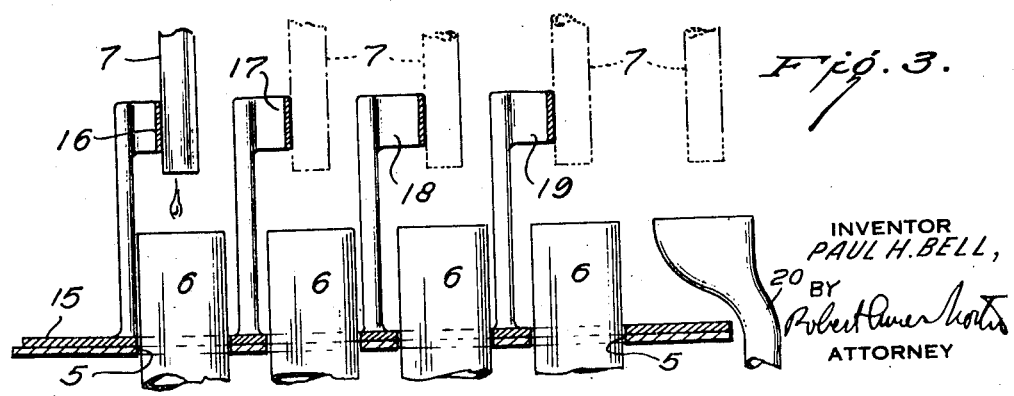

Jan. 3, 1950     P. H. BELL     2,493,382
AUTOMATIC SAMPLE COLLECTOR
Filed Oct. 29, 1948     3 Sheets-Sheet 3
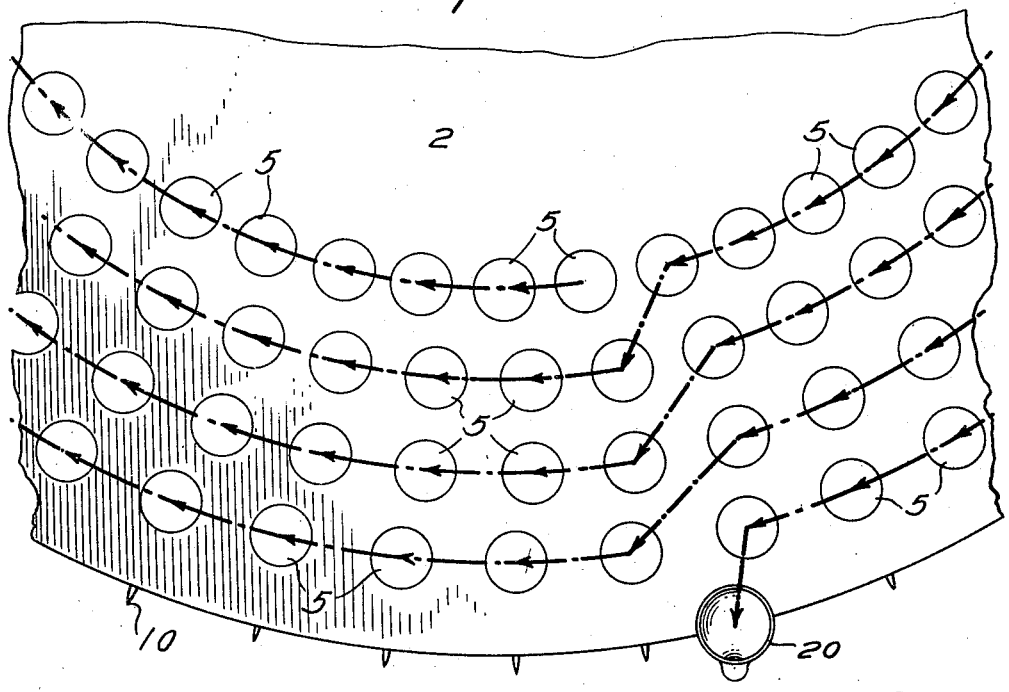
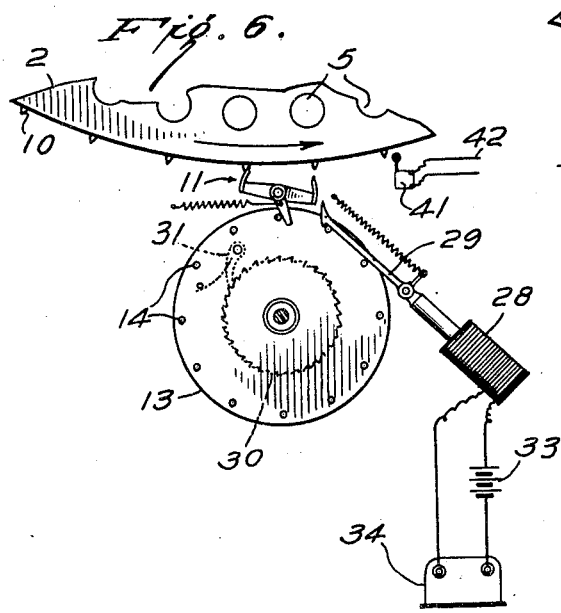
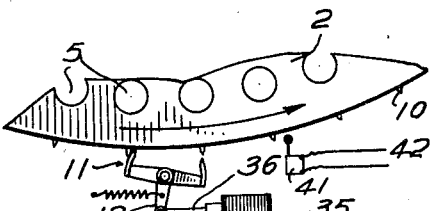
INVENTOR
PAUL H. BELL,
BY
ATTORNEY Patented Jan. 3, 1950

2,493,382

UNITED STATES PATENT OFFICE 2,493,382

AUTOMATIC SAMPLE COLLECTOR

Paul Hadley Bell, Noroton Heights, Conn., assignor to American Cyanamid Company, New York, N. Y., a corporation of Maine Application October 29, 1948, Serial No. 57,379

5 Claims. (Cl. 73—421)

This invention relates to an improved automatic sample collector capable of collecting a large number of liquid samples at intervals determined by time or other factors and capable of operating for long periods of time without supervision.

There are many operations which involve taking samples at intervals. For instance, in many distillations it is necessary to take samples at frequent intervals determined by time, temperature or other factors. Other instances are chemical reactions in which samples may be taken at various times to determine rates of reaction and other chemical or physical changes. Perhaps the most important use, however, for the present invention lies in the operation of so-called chromatographic columns in which a liquid mixture is passed through a column resulting in selective adsorption of one or more components followed by flowing of other liquids through the column to selectively dischange the various adsorped materials. Such columns operate very slowly the whole cycle often taking several days and it is frequently important to obtain samples at intervals. In the past this has necessitated constant human supervision which is both expensive and wasteful of man-power.

The present invention is directed to a machine which is capable of taking a very large number of samples, for instance a hundred or more at predetermined intervals, for example time intervals. Essentially the device comprises a plate or stand capable of intermittent rotation with a large number of holes arranged in concentric circles, each hole carrying a sample vessel such as, for example, a test tube. A filling spout is provided under which the sample containers are progressively moved by an intermittent motion of the plate and means are provided for shifting the filling spout to the next row when the first row is completely filled.

Movement of the plate or framework is intermittent preferably by a type of escape mechanism so that movement in an amount sufficient to bring the next container under the filler. The automatic shifting from one circle to the next permits a very large number of containers in a plate or framework of moderate size and makes it possible to take samples at frequent intervals over a very long period of time, such as overnight or even in the case of certain operations over a weekend. The operation is automatic, the mechanism is rugged and no supervision is required except to start or stop the machine.

For many operations such as, for example, investigations of reactions the operation of many chromatographic columns and the like, it is sufficient to take samples at frequent predetermined time intervals, for example every five minutes or every ten minutes. In such a case the movement of the plate or framework may result exclusively from actuation of the escape mechanism at predetermined time intervals and this constitutes the simplest form of the device of the present invention. For other operations, however, it may be necessary to shift from one sample container to another on changes of other physical characteristics or quantities. For example in the case of distillations it may be necessary to take samples at predetermined temperature intervals and in such a case the escape mechanism can be actuated by conventional recording thermometric means. However, in distillations the volume of cuts at various temperatures may vary throughout a wide range, certain cuts amounting to only a few drops and others to a large volume when the temperature reaches the point at which a major constituent of a mixture distills over. While it is possible to use containers sufficiently large so that even the largest volume cut will not cause overflowing this is very awkward because all of the containers must then be of the size needed only for a maximum cut resulting in a very inefficient use of the machine. In one modification of the invention this difficulty is avoided by combining actuation of the machine at time intervals with actuation by temperature, for example if the rate of distillation is such that the average container size is adequate for five minutes the actuation of the machine may be both by temperature and by time. Thus, for example, in case of a short cut less than five minutes, the movement of the machine in each case would result by actuation of the escape mechanism from the recording thermometric means. However, if at a certain temperature a large cut, let us assume one that would last for forty minutes, starts to come over, the escape mechanism would be actuated in the first instance by the recording thermometric means thereafter, during the forty minutes throughout which the cut flows the machine would be actuated every five minutes by clock work or similar timing means so that the cut would be distributed over eight or nine containers.

Instances where actuation both by time and other factors are also presented in chromatographic work. Where for example different adsorped layers may have different physical characteristics such as color, infra-red adsorption at a particular wave length, refractive index, turbidity and the like. In such a case the other physical characteristics, for example infra-red adsorption, may be used to actuate the movement of the device of the present invention preferably by suitable electrical relays and solenoids. At the same time where there is a relatively large layer of a single component which would flow for a period of time greater than the capacity of an individual container the machine would be actuated by time intervals as in the distillation operation described in the preceding paragraph.

It is an advantage of the present invention that a very rugged escape movement can be provided by pins on the outer periphery of the rotating plate or framework which are engaged by conventional escapement mechanism. The latter may be driven mechanically by a solenoid for electrical actuation or by mechanical means and it is an advantage of the present invention that the device is not restricted to the use of any particular means for effecting actuation of the escape mechanism. This gives great flexibility to the device and permits its use in a large number of fields. Also the flexibility permits a single device being used for different purposes which is a practical advantage of considerable importance because one of the large fields of utility of the device of the present invention is in research laboratories where the same device must often be used for different purposes at different times.

The invention will be described more in detail in conjunction with several representatives types of actuation which are typical illustrations but are not intended to limit the scope of the invention. The detailed description will be in conjunction with the drawings in which:

Fig. 2 is an enlarged detail of Fig. 1 showing the escapement mechanism and the shifting means for moving the filler from one row of containers to the next;

Fig. 3 is a vertical section through Fig. 2 along the line 3—3;

Fig. 5 is a diagrammatic plan view showing the course of travel of the device through several revolutions;

Fig. 6 is a plan view of a modified actuating device, and

Fig. 7 is a plan view of another modified escape mechanism actuated entirely by electrical means.

Figure 1:
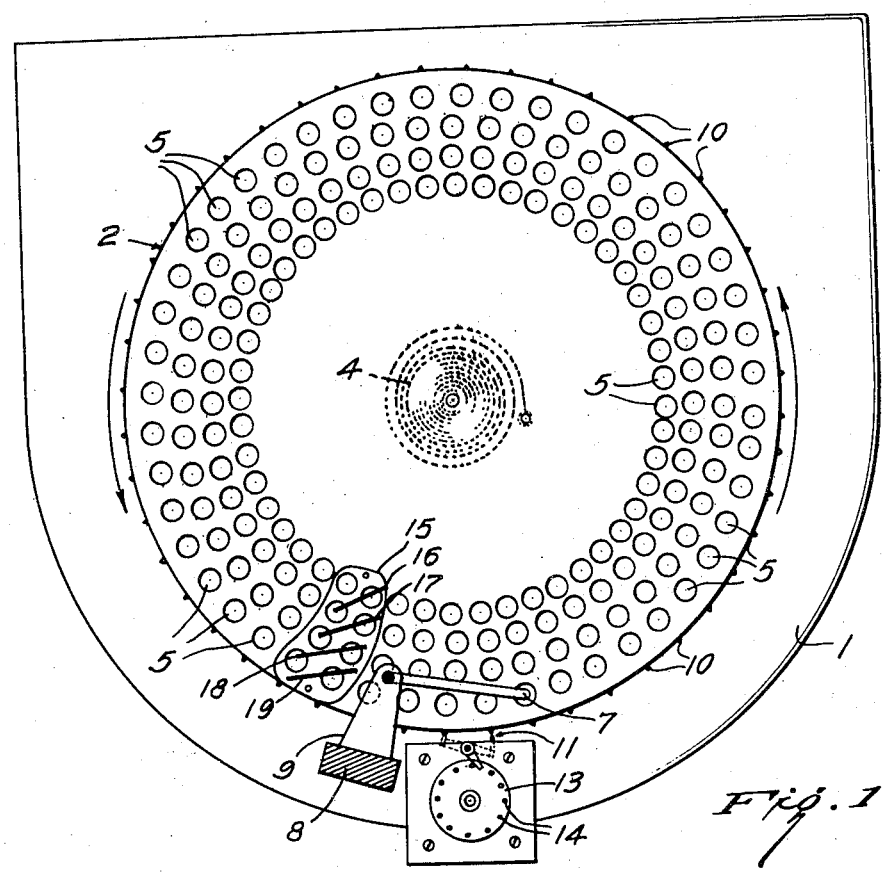
Fig. 1 is a plan view of a simple device with timed mechanical escapement actuation.
Figure 4:
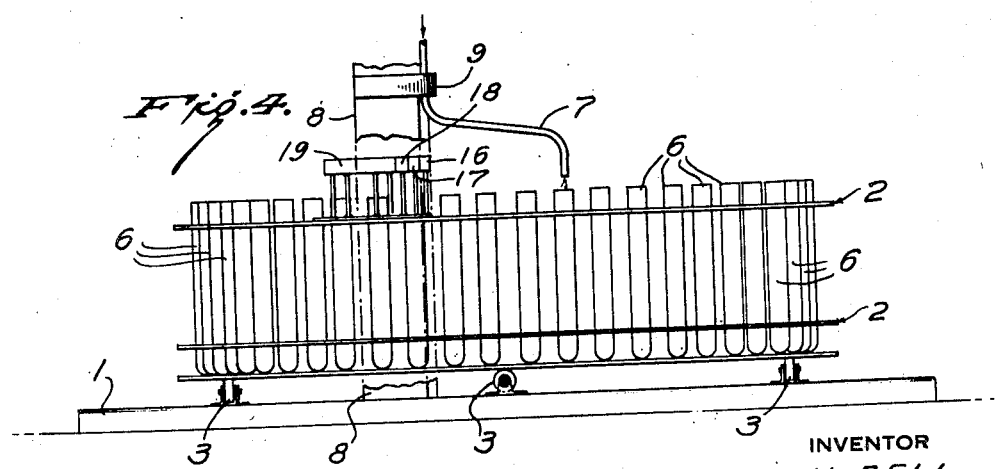
Fig. 4 is a vertical elevation, partly broken away of the device shown in Fig. 1.

The device shown in Figs. 1 to 4 is provided with a table 1 on which a framework 2 consisting of three plates is capable of rotation on the rollers 3. The power for moving the framework 2 comes from an ordinary main spring 4 which urges the framework to rotate in a counter-clockwise direction. The plates are provided with four rows of holes 5 into which test tubes 6 fit, the test tubes resting on the solid bottom plate of the framework. Intermittent motion is effected by teeth on the periphery of the upper plate of the framework 2 which engage an escape mechanism 11 which is provided with an actuating lever 12 which is engaged by pins 14 on a dial 13 slowly rotated by clockwork or preferably by an electric clock movement. The rotation may be set for example so that the escape mechanism is actuated every five minutes. The pins 14 may be removable so that every other pin may be removed to obtain actuation every ten minutes.

A filler pipe 7 extending from the device, the liquid discharge of which is to be samples, is pivoted in a plate 9 carried by a vertical support 8 attached to the framework 1. Initially the filler pipe is positioned over the opening 21 (Figs. 1 and 2) and the rotation of the timing mechanism turning dial 13 is started. The liquid discharge, for example, from chromatographic column, flows into the test tube under the opening 21 for five minutes at which point a pin moves the lever 12 far enough over to release one of the pins 10 contacting the left hand pallet of the escapement mechanism 11 and permits framework 2 to move forward one tooth. This rotation brings the opening 22 under the filler tube and for the next five minutes this test tube receives the sample. At the end of five minutes the next pin strikes the lever 12 and the same cycle is repeated advancing the framework 2 one tooth counter-clockwise.

The operation continues until the plate 15 comes around, a situation shown in Fig. 2 which figure illustrates three positions of the plate, first in solid lines, the second in dash and dot lines and the third in dotted lines. In the solid line position (Fig. 2) the filler is over hole 24 (Fig. 1). The next movement of the framework brings the filler over container 25 which is covered by the forward edge of the plate. This is shown in the dot and dash position on Fig. 2. At the end of five minutes this container is filled thus completing the inner circle and when the framework 2 moves to the next position, which is shown in dotted lines in Fig. 2, the deflector plate 16 carried by the plate 15 moves the filler over to hole 26 in the second row of holes. This is shown in dotted lines in Fig. 2. The relative positions of deflector plate and filler pipe are shown in the enlarged detail Fig. 3.

Operation continues for the second row of containers and then the filler pipe is moved over to the third row by the deflector plate 17. After the next complete rotation the deflector plate 18 moves the filler pipe over to the last row of openings and finally after the last container 27 is filled the outer deflector plate 19 moves the filler pipe over to a discharge opening 20 (Figs. 2 and 3) which can be led to a final collecting vessel or to waste. The spiral path followed in the four revolutions of the framework 2 is shown diagrammatically in Fig. 5.

Fig. 6 illustrates a modification in which the mechanical actuation of the escapement mechanism at predetermined time intervals is supplemented by electrical actuation in accordance with other physical changes. The same parts bear the same reference numerals. The disc 14 carrying the pins 13 is provided with a pawl 31 engaging a rachet disc 30 driven by the timing mechanism. Clockwise rotation of the disc 30 carries the disc 14 along with it but the latter can be moved clockwise with respect to the disc 30.

A solenoid 28 is provided with a spring-loaded rachet arm 29. When the disc 14 turns clockwise in normal operation driven by the timing mechanism, the successive pins 13 striking the arm 29 simply move the latter out against the pull of the spring and slip past. However, if the solenoid 28 receives a pulse of current from a suitable current source, such as the battery 33 through the switching device shown diagrammatically as 34, the movement of the core will cause the arm 29 to move a distance such that it will pull any pin which it engages a sufficient distance to cause tripping of the escapement mechanism by one of the other pins. Thus the escapement will be tripped and hence a new container presented to the filler pipe whenever the solenoid is actuated regardless of how long a time interval the former container had been filling.

It is often desirable to have some record of which receiver was under the filler pipe at different times correlated with the physical changes taking place. This may be affected by providing a microswitch 41 engaged by successive teeth on the plate 2. As the pin passes a switch, an electric impulse is sent through the wires 42 to the recording instrument from which the solenoid 28 is actuated, and can actuate the convention recording means for indicating when each container passed the switch.

The operation of the device may be described in connection with a distillation operation in which it is desired to take cuts at each degree change in distillation temperature. The switching device 34 would then be actuated by changing temperature, for example, by the convention contacts on a recording thermometer. When the temperature changes by a degree, the thermometer will produce a momentary closing of the switching means 34, resulting in the pulse of current through the solenoid 28. This will pull the lever 29 in a clockwise direction and will drive the disc 14 an angular distance equal to the spacing of two pins 13. A fresh container will, therefore, be presented to the filler tube and will begin to fill. If the temperature is rising sufficiently fast so that it takes less than the predetermined time interval, for example five minutes, for a temperature change of 1°, the solenoid 28 will be actuated again before there has been any tripping of the escapement by movement of the pins through the normal operation of the interval timer. On the other hand, if the temperature rises much slower so that the change of 1° takes place at an interval longer than five minutes, the disc 14 actuates the escapement and introduces a fresh container at the end of five minutes so that overflowing is prevented. The wires 42 of the microswitch 41 will be connected with the conventional auxiliary recording post on the recording thermometer and make a mark on the recording set so that it can be determined which container was being filled at each temperature.

Fig. 7 shows an arrangement similar to Fig. 6 but with electric actuation. The same parts bear the same reference numerals. Here instead of a disc with pins to produce a mechanical actuation of the escapement, the escapement actuating lever 12 is connected through a rod 36 to the core of a solenoid 35. A battery 33 which actuates the solenoid runs through two switching mechanisms in parallel. The first is the switching mechanism 34 which may be actuated by any desired change in characteristic as described in connection with Fig. 6, and the second is a timing disc 37 which is rotated by a synchronous clock motor and provided at its periphery with a series of insulating segments 38. A contact 39 bears on the periphery and the disc itself is connected to one terminal of the battery 33 by means of the wire 40. The microswitch 41 operates in the same manner as described in connection with Fig. 6.

The actuation of the escapement mechanism by a closing switch in the switching mechanism 34 proceeds as described in connection with Fig. 6 except that the solenoid 35 acts directly on the escapement instead of through the intermediary of the disc and pins. Actuation by time intervals, however, results electrically instead of mechanically. Every time contact 39 reaches a thin, uninsulated gap, current flows for a short period of time through the solenoid 35 and the escapement mechanism is actuated. In order to make the actuation of the timing disc clear, the relative dimensions of the uninsulated gaps have been exaggerated with respect to the size of the insulating segments. Actually, they are very narrow, only sufficiently wide so that the current will flow long enough to trip the escapement mechanism. It is, of course, undesirable to keep the solenoid 35 actuated for an extended period of time as this would lock out any response to currents resulting from the closing of the switch in element 34.

It will be noted that the escapement mechanism timing disc drive and solenoids are all of a design which is essentially spark proof. There is no danger, therefore, that during the operation of the sample collector electric sparks might be produced which could ignite vapors of inflammable liquids. This safety from the hazard of fire is an additional advantage of the device of the present invention and renders it suitable for use within inflammable liquids where complete freedom from spark risk is necessary.

I claim:

1. An automatic sampler for taking samples of liquid comprising in combination a rotatable circular framework provided with a plurality of concentric circles of openings adapted to receive sample containers, the openings being uniformly angularly spaced about the periphery of each circle, the openings in the different circles being so spaced that the corresponding openings in the various circles are arranged about an arc of a circle convex in the direction of movement of the framework, means for rotating the framework intermittently at predetermined intervals the angular movement being equal to the spacing of the openings in each circle, a pivoted filler tube adapted to register with successive openings and pivoted about the center of the circle on which the corresponding openings in the different circles are arranged, means carried by the framework adapted to engage the filler tube after filling of the last hole of any circle and on the next intermittent rotation of the framework to deflect the filler tube to the next hole of the adjacent circle.

2. A device according to claim 1 in which the deflecting means are slanting plates carried by and projecting above the top of the movable framework.

3. A device according to claim 1 in which the framework is provided with teeth on its periphery and a periodically actuated escapement is provided registering with said tooth periphery and adapted on actuation to permit step by step movement thereof, the teeth having the same angular spacing as the openings in the framework.

4. A device according to claim 3 in which the periodically actuated escapement comprises in combination an escape mechanism, an actuating lever, and a rotating disc provided with spaced pins engaging said actuating lever.

5. A device according to claim 4 in which the pins are removable whereby variation of interval of actuation of the escapement is provided.

PAUL HADLEY BELL.

REFERENCES CITED

The following references are of record in the file of this patent:

UNITED STATES PATENTS

| Number | Name | Date |
| --- | --- | --- |
| 1,228,078 | Truesdell | May 29, 1917 |

FOREIGN PATENTS

| Number | Country | Date |
| --- | --- | --- |
| 33,565 | Denmark | Aug. 18, 1924 |
| 325,376 | Great Britain | Feb. 20, 1930 |

Disclaimer 2,493,382.—*Paul Hadley Bell*, Noroton Heights, Conn. AUTOMATIC SAMPLE COLLECTOR. Patent dated Jan. 3, 1950. Disclaimer filed Feb. 10, 1951, by the assignee, *American Cyanamid Company*.
Hereby enters this disclaimer to claims 1 and 3 of said patent.
[*Official Gazette March 13, 1951.*]